April 1, 1958 S. N. HOWELL 2,829,267
HOT-BOX DETECTOR
Filed July 12, 1957
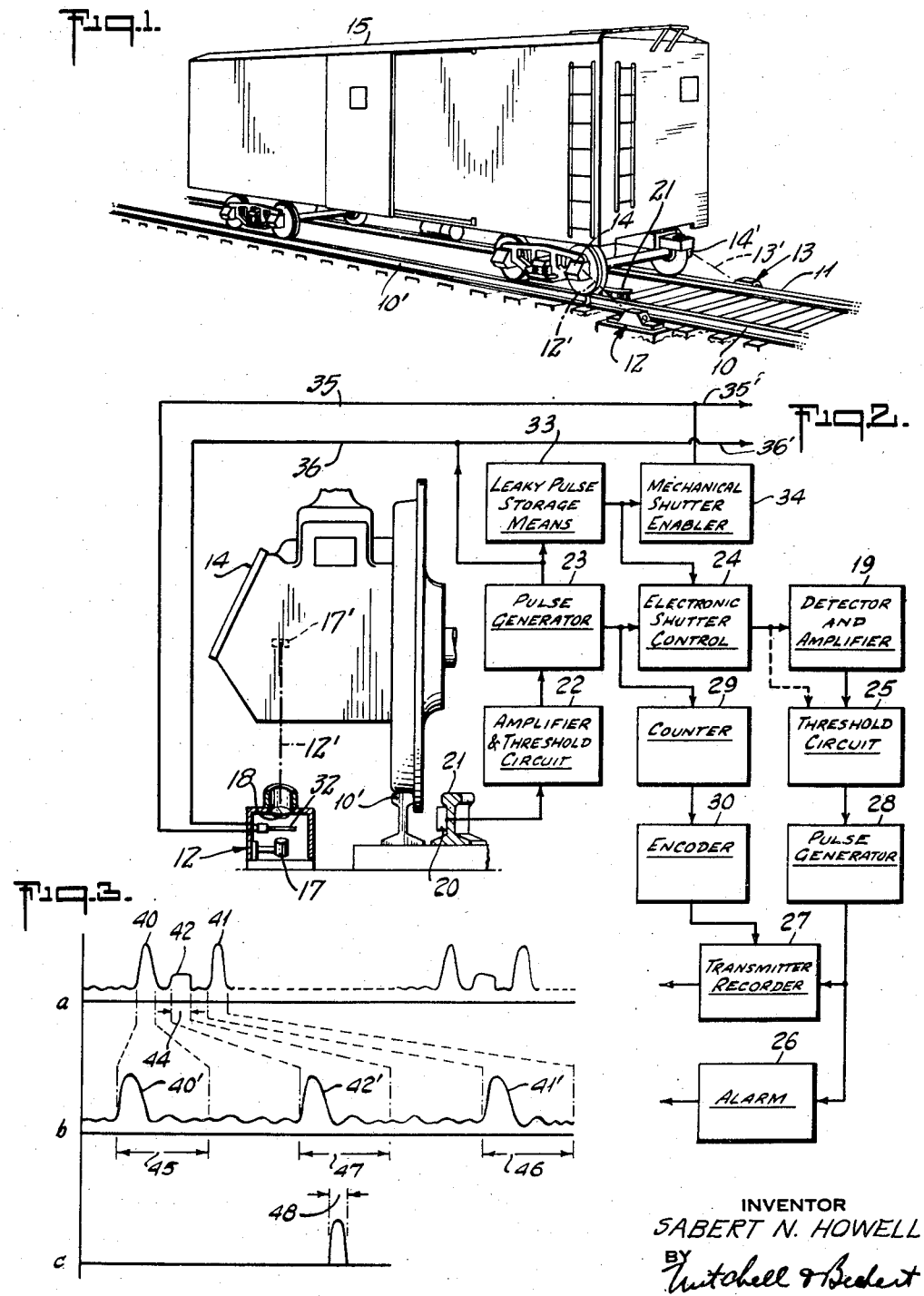
INVENTOR
SABERT N. HOWELL
BY
Mitchell & Bechert
ATTORNEYS

United States Patent Office 2,829,267
Patented Apr. 1, 1958

2,829,267

HOT-BOX DETECTOR

Sabert N. Howell, Huntington, N. Y., assignor to Servo Corporation of America, New Hyde Park, N. Y., a corporation of New York Application July 12, 1957, Serial No. 671,456

9 Claims. (Cl. 250—83.3)

This invention relates to trackside-mounted hot-box detecting equipment for use in detecting overheated journal-box conditions before achievement of a temperature considered dangerous to the safety of a passing railroad train. This application is concerned with improvements over the invention disclosed in my copending patent application Serial No. 506,125, filed May 5, 1955, and this application is a continuation-in-part of my copending application, Serial No. 515,406, filed June 14, 1955, now abandoned.

In hot-box detectors of the character indicated, and particularly in the variety in which shutter action is achieved by a trip mechanism controlling the gain or other electronic function of signal-processing circuitry at the output of the detector, the detector may fail to respond properly when the passing train is proceeding at slow speed. In detectors of the character indicated, the detector cell is continually (i. e. regardless of speed conditions) exposed to radiation, not only from the hot boxes, but also from spurious heat sources, such as hose ends, locomotive cylinders, brake shoes, and the like, depending upon the directional alignment of the response of the cell. The heat-responsive cell may, depending on its nature, become saturated and, therefore, less responsive to incident heat if exposure to high heat is sufficiently prolonged, and of course, the slower the train speed, the more prolonged such exposure will be, for exposure to any given journal box.

It is, accordingly, an object of the invention to provide an improved detector of the character indicated, wherein saturation or loss of sensitivity of the detector may be avoided for slow speeds of passing trains.

It is another object to provide an improved detector having a more extensive reliable range of response, regardless of the speed of passing trains.

It is also an object to meet the above objects with a device having a minimum of mechanically operating parts.

It is a further object to meet the above objects with a device in which mechanically moving parts are utilized to the minimum extent necessary, the extent of said use being determined solely by automatic means responsive to the speed of the passing train.

Other objects and various further features of novelty and invention will become apparent or will occur to those skilled in the art from a reading of the following specification in conjunction with the accompanying drawings. In said drawings, which show, for illustrative purposes only, a preferred form of the invention:

Fig. 1 is a simplified view in perspective of a section of track and of a freight car, one axle of which is shown passing twin detector installations of the invention;

Fig. 2 is a diagram including an enlarged fragmentary side view taken substantially in staggered vertical sectional planes transverse to the track and through the axle and one detector; Fig. 2 further includes an electrical block diagram with connections to parts shown in said vertical sectional plane; and Fig. 3 is a collection of three diagrams graphically showing response and operation of my device.

Briefly stated, the invention contemplates railroad hot-box detecting equipment comprising trackside-mounted heat-responsive means including for each unit a heat-responsive cell and optical means directionally aligning said cell for response primarily at the horizontal elevation of adjacent car-journal ends, that is, at that part of a journal box which projects beyond the side frame of the associated wheel truck. The response or optical alignment is directed predominantly such that within a range of wheel and axle-box sizes accommodating, for example, all freight cars or all passenger cars, corresponding parts of all journal boxes successively pass through the response field of the cell. In order to eliminate false signals identified with spurious sources, such as hot brake shoes, open hoses, and the like, I provide shutter means for temporarily activating the heat-responsive means. The shutter means includes a trip permanently mounted at the trackside to derive a shutter-actuating signal only when a passing wheel center is in the response field of the cell.

In a preferred form, the shutter-trip mechanism is purely electronic and governs a gain setting or a threshold in the signal-processing circuitry connected to the output of the cell so that, in effect, the cell is effectively exposed (or, rather, a heat observation is made) only when a hot box is in the field. For slow speeds, this arrangement is not completely satisfactory because the cell may become saturated by excessively large signals applied for excessively long periods of time. Accordingly, I provide auxiliary shutter means in the response alignment of the cell, and to control the auxiliary shutter, I provide speed-responsive means with a threshold determining a closure of the auxiliary shutter for detected speeds below the threshold and an opening of the auxiliary shutter for detected speeds above the threshold. The trip mechanism is connected in controlling relation with the auxiliary shutter so that if the shutter happens to be closed, meaning that a slow-speed train is passing, the trip alignment will govern exposure of the cell, regardless of the train speed.

Referring to the drawings, my invention is shown in application to a length of track including two rails 10—11. Permanently mounted at each side of the track, and preferably at the same location along the track, are two detector housings 12—13, each including heat-responsive elements having optical responses 12'—13' directionally aligned with the horizontal elevation of passing journal boxes. In the form shown, the journal box 14 of the rear wheel of the freight car 15 is in the field 12' of the detector 12; at the same time, the other journal box 14' for the same axle is in the field 13' of th detector 13.

Referring to Fig. 2, the detector 12 may include, within a fixed upstanding housing or pedestal 16, a heat-responsive cell 17 and optical means, such as an infrared-transmitting lens 18, may directionally align the response of cell 17 on the axis 12'. The cell 17 and its output are symbolized in Fig. 2 at the box 19, schematically suggesting provision of amplifying means immediately adjacent the detector cell itself.

As in said copending application, trip means may be provided to respond to the passage of a wheel center through the response field 12' and, in the form shown, such trip means is an acoustical element 20 fixedly carried as on the web of an auxiliary rail 21 immediately adjacent a rail break between rail sections 10—10', the rail break being so located with respect to the alignment axis 12' that the cell 17 is imaged (at 17') on a journal box substantially when the wheel for the same journal box actuates the trip 20; for the presently shown generally upwardly inclined alignment of axis 12, the rail break is thus longitudinally offset from the location of detectors 12—13. Thus, for each click developed by wheel transfer from one to the other of the rail sections 10—10', an amplifier and threshold circuit 22 may function to deliver a trip pulse shaped by generator 23 for application to electronic-shutter-control means 24. The connection from control means 24 to detector-amplifier 19 will be understood schematically to suggest that the gain of the amplifier at 19 may be substantially reduced at all times, except when a suitably shaped pulse is delivered by pulse-generator and control means 23—24. Alternatively, or in addition, the shutter-control means 24 may govern the operation of a threshold circuit 25 determining whether the magnitude of a detected heat signal is sufficient with respect to a reference to justify actuation of alarm or other remote-signalling means 26—27.

In the form shown, a pulse generator 28 suitably shapes all signals delivered by the threshold circuit 25 for application to the alarm and transmitter-recorder means 26—27. Further, in order to correlate hot-box signals with axle location, I show provision of axle-counting means 29 and encoder means 30; the latter responds to trip pulses and is in modulating relation with the transmitter-recorder 27, all as more fully disclosed in said copending application.

In accordance with the invention, automatic means may assure that the cell 17 will not be saturated or severely reduced in sensitivity when a hot source on a slow train passes through the response axis 12'. For this purpose, I provide auxiliary shutter means 32 on the response alignment 12' of cell 17. The shutter means 32 may be an electron-optical device, such as a germanium cell, functioning in response to charge modulations to determine whether or not the cell 17 is to be exposed; alternatively, the shutter means 32 may be purely mechanical. In any event, the shutter means 32 is preferably open at all times as long as the speed of a passing train exceeds a given threshold, which of course depends upon response characteristics of the detector cell material employed. For speeds below such threshold, the shutter 32 is effectively closed and blocks any heat response of cell 17.

The speed-responsive means determining the above-explained operation of the auxiliary shutter 32 may be merely a leaky pulse-storage device 33, such as a capacitor with a leakage resistance and responsive to the output of trip-pulse generator 23. If the train is proceeding fast enough, a given charge will be developed and maintained at storage means 23, so that a threshold determined by the shutter-enabling device 34 may be exceeded, and means 35 may control shutter 32 to hold the same in open position. For speeds below such threshold, the pulses developed by trip generator 23 will not recur frequently enough to maintain the threshold charge, and line 35 will be effective to close shutter 32, thus protecting against saturation or material loss of sensitivity of the detector cell 17.

For the slow speeds at which the cell 17 would otherwise saturate or be characterized by reduced sensitivity, I use shutter 32 as the sole means of determining detector response (i. e. exposure time); this function may be accomplished by providing a shutter-actuating connection 36 from the pulse generator 23 to shutter 32. This connection will be understood effectively to open shutter 32 transiently, and only at the instant of passage of a wheel center through the directional alignments of the responses 12'—13'; at the slow speeds for which shutter 32 is called upon to operate, the exposure of cell 17 will be a fraction of the time during which the box 14 is in the field 12'. The shutter-controlled functions achieved by line 35—36 will be understood to be effective not only for controlling the shutter 32 at detector 12, but also for similarly and simultaneously controlling the corresponding shutter (not shown) contained within the detector 13 on the other side of the train, so that but one trip mechanism and speed-responsive device will suffice for the two detectors 12—13; lines 35'—36' suggest such connections for detector 13.

Fig. 3 is a collection of simplified drawings suggestive of electrical response developments at cell 17, both with and without the use of the shutter 32. Curve a represents response at a speed above threshold and assuming spurious or undesired heat-sources both forward and to the rear of each journal box; thus, if one or more of such undesired heat sources are present as the wheel truck passes the axis 12' (or 13'), one or more of several large transient reponses 40—41 may be derived and could bracket the relatively low response 42 representing heat at the journal box. Trip means 23 will be understood to be effective within the time interval 44, so as effectively to exclude the spurious or undesirable responses 40—41.

For slower speeds (curve b), spurious sources and a journal box will be in the responsive field 12', (or 13') for substantially longer periods of time, and the responses 40—41' suggest saturation and therefore loss of response long before complete passage of the intervals 45—46 during which the respective spurious sources are in the response axis 12' (or 13'). Similarly, the response 42' to a journal box may also involve saturation, with consequent loss of response for an important fraction of the interval 47 during which the journal box is in the response axis 12' (or 13').

The curve of Fig. 3c suggests that because the shutter 32 is normally closed (at speeds below threshold), responses 40'—41' will be avoided, and response 42' will not arise because pulse generator 23 will effect shutter opening and closing at 32 only for the relatively short interval 48, which interval may be of the same duration, regardless of the speed of the train, so that even if the train comes to a halt just as the trip mechanism 23 functions, a pulse of duration indicated at 48 will be the most to which the cell 17 is exposed.

It will be seen that I have described an improved hot-box detector having application regardless of the speed of a passing train. The arrangement is such as to entail minimum use of mechanical parts; i. e. if shutter 32 is mechanical, it will only be operated for slow trains and will remain unoperated for faster trains.

While I have described the invention in detail for the preferred form shown, it will be understood that modifications may be made within the scope of the invention as described in the claims which follow.

I claim:

1. A railroad hot-box detector, comprising trackside-mounted means including a heat-responsive cell, optical means directionally imaging said cell for alignment with corresponding parts of passing journal boxes, signal-processing means including an amplifier connected for response to the output of said cell, wheel-trip means so located with respect to the optical response of said cell as to develop a control impulse when said cell is imaged on a journal box, said trip means being connected in gain-controlling relation with said amplifier, the connection being such as to eliminate or reject substantially all signals except those derived substantially at the instant of movement of a wheel past said trip means, shutter means interposed between said cell and the journal box for a passing wheel, speed-responsive means responsive to the speed of a passing train and including a threshold device for holding said shutter effectively open and for thus effectively continuously exposing said cell for detected train speeds exceeding threshold, said speed-responsive means closing said shutter for speeds below said threshold, and a shutter-opening connection from said trip means to said shutter, whereby for slow speeds, that is, speeds below threshold, the exposure of said cell may be determined largely by the functioning of said shutter.

2. A railroad hot-box detector, comprising trackside-mounted means including a heat-responsive cell, optical means directionally aligning the response of said cell at substantially the elevation of corresponding parts of journal boxes, shutter means on the optical response alignment of said cell and in exposure-controlling relation with said cell, means responsive to the speed of the passing train and including a threshold device connected to said shutter in a manner to control a closing of said shutter only for detected speeds below threshold, trip means responsive to the passage of a wheel center substantially through the optical response alignment of said cell, and an actuating connection from said trip means to said shutter for transiently opening said shutter upon detection of a wheel center at substantially said alignment.

3. A detector according to claim 2, in which said shutter is mechanical and is actuable to positions substantially closing off the response of said cell and substantially fully exposing said cell for response to a journal box.

4. A detector according to claim 2, in which said shutter is an electron-optical shutter.

5. A detector according to claim 4, in which said shutter is a germanium cell.

6. A railroad hot-box detector, including tracksidemounted means, comprising a heat-responsive cell, optical means directionally aligning the response of said cell at substantially the elevation of corresponding parts of passing journal boxes, shutter means on the optical response alignment of said cell and positioned to control the passage of energy to said cell on said alignment, speed-responsive means responsive to the speed of a passing train, and a control connection from said speed-responsive means to said shutter means and determining shutter operation in accordance with the detected speed.

7. A railroad hot-box detector, comprising tracksidemounted means including a heat-responsive cell, optical means directionally aligning the response of said cell at substantially the elevation of corresponding parts of passing journal boxes, an optical shutter on the optical response alignment of said cell, speed-responsive means responsive to the speed of a passing train and in controlling relation with said shutter to determine a first operation of said shutter, and trip means responsive to the passage of substantially the central portion of a wheel through the response alignment of said cell and connected in controlling relation with said shutter to determine another operation of said shutter.

8. A detector according to claim 7, in which said speed-responsive means includes leaky electrical storage means, and means uniformly incrementally charging said storage means for each operation of said trip means.

9. A railroad hot-box detector, comprising tracksidemounted means including a heat-responsive cell, optical means directionally aligning the response of said cell at substantially the elevation of corresponding parts of passing journal boxes, trip means responsive to the passage of the central portion of a wheel substantially through the response alignment of said cell, said trip means being connected in controlling relation with the output of said heat-responsive means in such manner as to reduce such output at all times except at the time of operation of said trip means, speed-responsive means responsive to the speed of passing trains and including a threshold device connected in controlling relation with said shutter to close said shutter for speeds less than threshold and to open said shutter for speeds exceeding threshold, a shutter-opening connection from said trip means to said shutter, and a gain-restoring connection from said speed-responsive means to the output of said heat-responsive means, whereby as long as the response of said cell is determined by operation of said shutter, the gain control for the output of said heat-responsive means will not be modified.

No references cited.